3,235,454
ANABOLIC COMPOSITION AND METHOD
OF USING SAME
William Earl Mattox, Marion County, Ind., and Karl
 Junkmann, Berlin, Germany; said Mattox assignor to
 Mattox and Moore, Inc., Indianapolis, Ind., a corpora-
 tion of Indiana, and said Junkmann assignor to Schering
 AG., Berlin, Germany, a corporation of Germany
No Drawing. Filed Apr. 19, 1962, Ser. No. 188,850
11 Claims. (Cl. 167—53)

This invention relates to compositions and a method for improving and promoting meat-production in meat-producing animals, as in beef and sheep and especially in fowl. The invention is concerned with improving and controlling anabolic and lipogenic processes in the animals, to produce more and better meat in less time, and at less expense, and especially to produce improved "finish" in a shortened growing period and at a date which can be controlled and predetermined by the grower.

Heretofore, anabolic and lipogenic effects have been produced in chickens and turkeys by caponizing or hormonizing the animals by injection administration of the estrogen compound diethylstilbestrol. See for example, F. C. Moore and W. E. Mattox Patent No. 2,681,297. Diethylstilbestrol is also administered to cattle, both in the feed and by injection, for similar purposes. See for example W. Burroughs Patent No. 2,751,303.

It is an object of this invention to provide improvements over these prior procedures and to overcome certain disadvantages and deficiencies which they involve. On the one hand, for example, administration by injection is advantageous over administration in the feed, in that less medicament is required, less waste is incurred, better control is obtained, and greater certainty of action is ensured, especially with poorer animals which especially need treatment but which have such poor feeding habits that they fail to get the effective amounts of medicament in their feed. On the other hand, previously available injectables have the disadvantage of relatively short action, and of producing excessive initial shock and sexual excitement, and of leaving objectionable residues of medicament in edible portions of the animals at optimum marketing and slaughter times. In chickens, practical dosages of diethylstilbestrol compositions administered by injection (both in paste compositions and in pellets) produce hormonizing effects which last about three weeks and then markedly diminish, so that the optimum slaughtering time is three to four weeks after treatment. At such times, however, residues of diethylstilbestrol have been found in edible tissue, for example in the liver and skin. Thus, with previously available injectables, which contained diethylstilbestrol, the hormonizing effect did not extend beyond or outlast the presence of detectable residues.

It is the object of the present invention to provide injectable agents and compositions which will have relatively long-acting anabolic and lipogenic effects that extend well beyond the presence of residues and give optimum slaughter times when no residues will be present in the animal. It is a further object of the invention to produce the desired anabolic and lipogenic effects with a minimum of undesired excitement and sexual stimulation. It is thus an object of the invention to provide anabolic and lipogenic agents and compositions which will safely and conveniently produce effective and long-lasting desirable anabolic and lipogenic results, without undesirable side-effects.

It is a further object of the invention to provide a process of producing anabolic and lipogenic effects in meat producing animals, especially fowl and cattle, which will be both effective and safe, and will be practical and convenient and economically feasible.

We have discovered that highly advantageous anabolic and lipogenic effects can be produced, and the foregoing objects attained, by the use in meat producing animals of long chain aliphatic carboxylic acid esters of the natural estrogen $\beta$-estradiol.

In general, the esters which may be used are long chain hydrocarbon aliphatic carboxylic acid esters of 17 $\beta$-estradiol in which the long-chain hydrocarbon aliphatic acid radical contains from 11 to 18 carbon atoms and not more than two double bonds. These include saturated aliphatic acid radicals ranging from the undecoate containing 11 carbon atoms to the stearate containing 18 carbon atoms. They also include radicals of aliphatic acids containing one or two double bonds, such as oleic acid and linoleic acid.

These may be represented by the following formula:

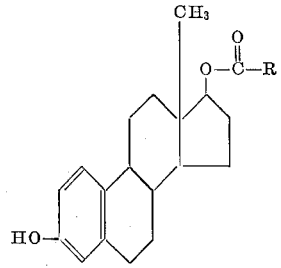

in which R represents a long-chain hydrocarbon aliphatic group containing from 10 to 17 carbon atoms and not more than two double bonds.

A preferred compound is $\beta$-estradiol-17-monopalmitate. This has the empirical formula $C_{34}H_{54}O_3$, has a molecular weight of 510.80, melts in the range of 81° to 85° C., gives a specific rotation of $[\alpha]_D^{20} = +29°$ to $+32°$ in dioxane, measured in a 2% w./v. solution (calculated on a dry weight basis), and has a saponification value of 107–113.

These long-chain 17-esters of $\beta$-estradiol are prepared by methods as described in the literature, for example in the American Patents 2,154,272 or 2,253,669 or 2,160,555 or the German DAS, 1,096,904.

The $\beta$-estradiol-17-ester is desirably administered in a manner to produce a subcutaneous or intramuscular deposit for absorption over a prolonged period, and is desirably combined with a vehicle in a composition adapted to be administered through the skin of the animal.

Solid compositions can be used, as in pellets, and the pellet form may serve to produce an even more prolonged effect, especially in large animals. In fowl, however, pellet implantation is relatively difficult and slow, and may produce foreign body reactions which interfere with the desired absorption. Liquid compositions would serve to introduce the medicament into the animal body, but with liquids in which the medicament is insoluble, such as with aqueous liquids, the liquid compositions would be suspensions and would involve difficulties of maintaining the insoluble agent in uniform distribution and of injecting liquids containing suspended solids. If liquids are used in which the medicament is soluble, for example, oils, the resulting compositions may fail to produce the localized deposits which we consider desirable, especially in fowl.

We prefer a composition in plastic semi-solid state in which the β-estradiol-17-ester is held in uniform distribution in a vehicle which is readily soluble in body fluids. Such semi-solid compositions may be administered in accurate doses by forced extrusion injection, as with the injection gun shown in Moore and Mattox Patent No. 2,624,338, and such administration is convenient and rapid and has been found to be especially effective.

Preferred plastic compositions contain the ester in uniform distribution (suspended or dissolved) in a water soluble vehicle. In physical state at animal body temperatures and at lower temperatures, the composition is semi-solid and substantially non-flowing, but has sufficient plasticity to be extruded under elevated pressure through a hypodermic needle of reasonable size, for example, extrudable at a pressure of 200 to 500 pounds per square inch through a No. 16 hypodermic needle. On injection, for example, beneath the skin of the neck of a chicken at the base of the skull, the stiff physical state of the vehicle tends to hold the injected mass close to the site of injection while the body fluids dissolve away the vehicle to deposit the medicament in a localized area.

While other water-soluble vehicles may be used to obtain the desired semi-solid consistency, we preferably use a so-called water soluble wax of high molecular weight and normally a relatively stiff solid, in combination with a plasticizer. The water-soluble wax of our composition is desirably one or a mixture of polyethylene glycols having an average molecular weight of the order of 4000 or higher, which is definitely solid at high atmospheric temperatures, and solid at the high body temperatures of the animals, for example, the chicken body temperature of 107° F. The plasticizer used may be any of a number of liquids which are miscible with the polyethylene glycol and are known to have plasticizing effects in combination with it. Suitable plasticizers include polyhydric alcohols, such as glycerin, propylene glycol, and preferably polyethylene glycols of low molecular weight and of normally liquid state, such as the polyethylene glycols having an average molecular weight of the order of 200 to 300.

A vehicle including a polyethylene glycol wax and a plasticizer desirably contains from 30% to 70% (by weight) of a polyethylene glycol having an average molecular weight of 4000 or higher, and from 70% to 30% of the plasticizer such as polyethylene glycol liquid having an average molecular weight of 200, and most desirably contains from 40% to 60% of the polyethylene glycol and from 60% to 40% of the plasticizer.

A composition in accordance with our invention may be prepared by mixing the active agents and the vehicle in any suitable way. Preferably, in making the plastic semi-solid composition, the vehicle may be melted, as at a temperature of about 80° C., the water insoluble β-estradiol-17-ester is added to the hot mixture, and the resulting mixture is stirred to thoroughly distribute the ester throughout the mixture. In the preferred vehicle, the esters appear to go into solution under these conditions. The hot mixture may be filled into suitable containers, and is then brought to room temperature, at which it takes on the desired physical state of a plastic semi-solid paste-like mass. The semi-solid consistency of the composition will retain a high concentration of the active ingredient and maintain the uniform distribution thereof throughout the composition during storage, distribution, and use. The desired dosage may therefore be contained in a relatively small quantity of the composition.

The amount of β-estradiol-17-ester in the composition may vary depending on the dosage desired. For treatment of chickens we may use a dosage of from 1 to 15 mg. of β-estradiol-17-monopalmitate. In producing roaster chickens, we conveniently use single doses of 5 mg. or preferably 10 mg. each, in a composition containing such dose in a volume of 0.226 ml., which is the volume administered per shot with one commercial injection gun of Patent No. 2,624,338, and inject these doses about 6 weeks before slaughter. For treatment of cattle we desirably use a more concentrated composition, which may contain up to 60 mg. or more of β-estradiol-17-monopalmitate per shot, and this may be varied to suit the weight of the animal. In cattle we may use doses ranging from 10 mg. to 60 mg. per dose, for example, 20 mg. per dose for 500 lb. cattle and 45 mg. per dose for 1000 lb. cattle. For lambs we may use from 5 to 30 mg. per dose and preferably about 15 mg. per dose.

We have found that the use of the long-chain aliphatic carboxylic acid 17-esters of β-estradiol, and especially β-estradiol-17-monopalmitate, produces marked anabolic and lipogenic effects in meat producing animals, and especially a substantially improved "finish" in a time period which can be predetermined. By this means the grower can control and predetermine the date at which the desired finish will be produced, and can thus prepare animals for marketing at predetermined dates.

We have found, further, that with the use of such esters, the effect produced is relatively long-lasting and extends to a time at which no residues of the esters are detectable in the animal body. The treatment thus gives an optimum slaughter time when the desirable effects are present but when no residues are present.

The new compositions are a substantial improvement over the previously used diethylstilbestrol compositions. Not only do they avoid residues and provide a more prolonged action, but the effects are better in other respects. For example, in chickens, the administration of β-estradiol-17-esters causes less shock than with prior compositions, it does not produce abrupt increases in feed consumption and consequent digestive disorders, and does not require the use of special high-carbohydrate feeds immediately following administration, as did the diethylstilbestrol compositions. Further, both with fowl and larger animals, those treated with the present compositions are quieter and less excitable than those treated with prior compositions. With turkeys, the new composition does not cause the "treading" which occurred when diethylstilbestrol was used.

The following examples illustrate the invention and indicate the improved results obtained by the use of the esters and compositions of the invention.

EXAMPLE 1

A mixture of 197 grams of polyethylene glycol 4000 (i.e., having an average molecular weight of 4000), 295 grams of polyethylene glycol 200 (i.e. having an average molecular weight of 200), and 20 grams of β-estradiol-17-monopalmitate was heated to between 75° and 80° C. with stirring until the polyethylene glycol 4000 was melted and the β-estradiol ester completely dissolved. While still in hot liquid state, the composition was filled into carpule-type tubes closed at one end by a rubber stopper. The tubes were set on end in a water bath at 26° C. to insure uniformity of congealing and to avoid air pockets, and when the material was fully congealed the open end of each tube was closed with a rubber stopper. Each tube contained slightly more than 11.3 ml. (about 13 grams) of composition, or enough for 50 shots of 0.226 ml. each, with each shot containing 10 mg. of β-estradiol-17-monopalmitate.

Similar tubes were prepared containing half-strength composition, to provide shots each containing only 5 mg. of β-estradiol-17-monopalmitate for use in Example 3 below.

A group of 100 Arbor Acre X Vantress cross cockerels 37 days old were divided into two groups of 50 birds each. All birds were wing-banded and individually weighed at the beginning and at the end of the 6-week test. The birds of one group were each injected subcutaneously at the base of the skull with one shot of the composition described above and containing 10 mg. of β-estradiol-17-monopalmitate. The other group of 50 birds were untreated and served as negative controls. The birds were fed and watered ad libitum. Feed protein levels were at 20% for the first two weeks, 18% for the next two weeks, and 16% for the final two weeks. At the end of six weeks the birds were slaughtered, were again weighed after evisceration, and were graded or scored for finish.

Both the treated birds and the untreated control birds were scored by the same person, who was unaware of the treatment received by the birds being scored. Scoring was on a numerical basis, as follows:

*Score of 1.*—This represents the highest quality finish. There is evidence of fat between the feather tracts over the breast and a light fat deposition over the drumsticks. The skin is smooth and has a silky texture.

*Score of 2.*—There is less fat between the feather tracts over the breasts and on the drumsticks. The skin is smooth and silky. There may be some abdominal fat but not sufficient to cause the bird to be graded B according to United States Department of Agriculture standards (U.S.D.A. Poultry Grading Manual).

*Score of 3.*—There is a minimum fat covering over the breast and drumsticks. The skin may be slightly rough, and open feather follicles may be visible.

*Score of 4.*—This is essentially the finish of a grade B chicken by U.S.D.A. standards, or there may be excessive abdominal fat.

*Score of 5.*—This represents U.S.D.A. grade C finish or lower.

The results of this test are shown in the following table:

Table I

|  | Controls | Treated Birds |
|---|---|---|
| Dose, β-estradiol-17-monopalmitate, mg | 0 | 10 |
| Number of cockerels | 50 | 50 |
| Age at start of test (days) | 37 | 37 |
| Age at end of test (days) | 81 | 81 |
| Duration of test (days) | 44 | 44 |
| Average weight at start (lbs.) | 1.68 | 1.65 |
| Average weight at finish (lbs.) | 5.48 | 5.44 |
| Average weight gain (lbs.) | 3.80 | 3.79 |
| Feed efficiency | 3.43 | 3.84 |
| Average eviscerated wt. (lbs.) | 4.16 | 4.04 |
| Eviscerated yield (percent) | 75.84 | 74.34 |
| Average dressed finish score | 2.60 | 1.80 |

The statistically significant differences in these test results are the differences in grade or finish scores (lower numerical score indicating improved finish), and this was highly significant in favor of the treated group.

In the treated birds there was a striking difference in the physical appearance of fat deposits. There was notably less abdominal fat than in the control birds and less than has been commonly observed in birds treated with diethylstilbestrol. Further, the fat was of markedly firmer consistency and was less oily than that seen in birds treated with diethystilbestrol. The smaller amount and firmer texture of fat deposits make the birds treated with β-estradiol-17-monopalmitate more desirable both to the processor and to the ultimate consumer.

The livers from the treated birds in this Example I were tested for uterotropic activity, by assay methods sensitive to as little as 10 parts per billion of estradiol, and no residues were found. Additional uterotropic activity tests were made with livers, muscle, and skin from similarly treated birds in various other experiment runs, and in all cases, no residues were found.

EXAMPLE 2

Example 1 was repeated, using an additional 80 cockerels of the same strain as in Example 1, divided into two groups of 40 birds each. The results are summarized in the following table.

Table II

|  | Controls | Treated Birds |
|---|---|---|
| Dose, β-estradiol-17-monopalmitate, mg | 0 | 10 |
| Number of cockerels | 40 | 40 |
| Age at start of test (weeks) | 5 | 5 |
| Age at end of test (weeks) | 11 | 11 |
| Duration of test (weeks) | 6 | 6 |
| Average weight at start (lbs.) | 1.22 | 1.26 |
| Average weight at finish (lbs.) | 4.41 | 4.39 |
| Average weight gain (lbs.) | 3.19 | 3.13 |
| Feed efficiency | 3.65 | 3.62 |
| Eviscerated weight | 2.99 | 3.09 |
| Yield percent | 67.9 | 70.5 |
| Average dressed score | 3.00 | 1.95 |

This test showed significant differences for dressed scores, indicating a markedly better finish in the treated birds.

EXAMPLE 3

Example 1 was repeated, with another group of 75 cockerels, divided into three groups of 25 each. One group (A) received 10 mg. doses of β-estradiol-17-monopalmitate, a second group (B) received 5 mg. doses (prepared as set forth in Example 1 but with half the medicament), and the third group (C) received no shots and served as negative controls. The results are shown in the following table.

Table III

|  | Controls | Treated Birds | |
|---|---|---|---|
|  | Group C | Group B | Group A |
| Dose, β-estradiol-17-monopalmitate, mg | 0 | 5 | 10 |
| Number of cockerels | 25 | 25 | 25 |
| Age at start of test (weeks) | 5 | 5 | 5 |
| Age at end of test (weeks) | 11 | 11 | 11 |
| Duration of test (weeks) | 6 | 6 | 6 |
| Average weight at start (lbs.) | 1.63 | 1.64 | 1.69 |
| Average weight at finish (lbs.) | 4.58 | 4.75 | 5.10 |
| Average weight gain (lbs.) | 2.95 | 3.02 | 3.41 |
| Feed efficiency | 3.03 | 3.25 | 3.35 |
| Average eviscerated wt. (lbs.) | 3.27 | 3.38 | 3.61 |
| Eviscerated yield (percent) | 72.0 | 73.4 | 74.5 |
| Average dressed score | 3.04 | 2.44 | 2.00 |

In this test, statistically significant differences were obtained for "Average eviscerated weight" and especially for "Average weight at finish" and "Average dressed score." The data show that the 5 mg. dose level produced a significant carcass finish improvement when compared with the control. The 10 mg. dose was, however, more effective than the 5 mg. level since it caused a more marked improvement in finish over the lower dose. Liver, muscle, and skin of both groups of treated birds were assayed for uterotropic residues, and none were found.

EXAMPLE 4

A preliminary experiment on beef was carried out on a group of six cross-bred Angus Charollaris beef show animals. They were weighed and started on feed January 1, 1961. They were housed together and fed from the same feed bunk. Water was supplied by an automatic float-controlled fountain. The animals were again weighed on June 22, 1961, and three steers were then given multiple-shot doses of a composition prepared as in Example 1 but containing 15 mg. per shot. Administration was through the skin immediately behind the ear (so that the site of injection would be discarded with the ear at the time of slaugher). The other three animals, two steers and one heifer, were continued as negative controls. The animals were again weighed on August 17, 1961. The results are shown in the following table.

Table IV

|  | Controls | Treated Animals | | |
|---|---|---|---|---|
|  | Group A | Group B | Group C |
| Number of animals | 3 | 2 | 1 |
| Average weight Jan. 1, 1961 | 395 | 407 | 340 |
| Average weight June 22, 1961 | 789 | 663 | 753 |
| Average lbs./day gain before treatment (174 days) | 2.26 | 1.48 | 2.38 |
| Treatment June 22, 1961, β-estradiol-17-monopalmitate, mg | None | 30 | 45 |
| Average weight August 17, 1961 | 899 | 875 | 940 |
| Average weight gains after treatment | 110 | 212 | 187 |
| Average lbs./day gain after treatment (56 days) | 1.96 | 3.96 | 3.34 |
| Percent increase over control, after treatment, percent |  | 102 | 70 |
| Value of added weight gain per animal at 26¢/lb |  | $26.52 | $20.02 |

Substantial improvements in weight gain were produced by the treatment, both in comparison with prior gains of the same animals and in comparison with the untreated controls.

EXAMPLE 5

Eight Florida cross-bred heifers—a mixture of Brahma, Hereford, and Shorthorn—were used in this experiment. They were in a lot with approximately 80 of these animals, and were ear-tagged for identification. Weights were taken June 24, 1961, at which time four animals were treated with 30 mg. of β-estradiol-17-monopalmitate in the same manner as in Example 4, one was treated with 60 mg. in the same way, and three were identified as negative controls. (The 60 mg. dosage produced no substantially better result than the 30 mg. dosage, and all treated animals are averaged in the results given below.) The animals were again weighed on August 26, 1961.

On September 2, 1961, the effects of the first treatment appeared to have run their course, and second administrations of the same dosages of β-estradiol-17-monopalmitate were given to the same animals.

The results of these tests are shown in the following table.

Table V

|  | Controls | Treated |
|---|---|---|
| Number of animals | 3 | 5 |
| Treatment June 24, 1961, β-estradiol-17-monopalmitate, mg | None | 30 (one 60) |
| Average weight June 24 (lbs.) | 584 | 586 |
| Average weight Aug. 26 (lbs.) | 695 | 734 |
| Average weight gain per animal (56 days) | 111 | 148 |
| Average lbs./day gain (56 days) | 1.98 | 2.64 |
| Percent increase over controls (56 days), percent |  | 51.8 |
| Average weight October 19 | 796.6 | 682 |
| Average weight gain, June 24 to Oct. 19 (117 days) | 212.6 | 276 |
| Average lb./day gain June 24 to Oct. 19 (117 days) | 1.81 | 2.35 |
| Percent increase over controls (117 days), percent |  | 30.4 |

EXAMPLE 6

Additional tests were run in the same manner as in Examples 4 and 5, using groups of animals randomly selected from a herd of Holstein steers. Different groups were given different dosages of β-estradiol-17-monopalmitate and one group of animals were used as negative controls. The animals were identified by ear tags. (Loss of such tags required dropping certain animals from the test at later stages.) The results are summarized in the following table.

Table VI

|  | Controls | Treated | | |
|---|---|---|---|---|
|  |  | Group A | Group B | Group C |
| Treatment October 13, 1961, β-estradiol-17-monopalmitate, mg | None | 10 | 20 | 30 |
| Number of animals | 9 | 5 | 5 | 5 |
| Average weight at first treatment | 543 | 548 | 524 | 536 |
| Results in 32 days: |  |  |  |  |
|    Average gain/animal (lbs.) | 63 | 81 | 99 | 67 |
|    Average lb./day gain | 1.96 | 2.53 | 3.09 | 2.09 |
| Results in 49 days: |  |  |  |  |
|    Average gain/animal (lbs.) | 79 | 94 | 126 | 100 |
|    Average lb./day gain | 1.61 | 2.09 | 2.04 | 2.13 |
| Second Treatment Dec. 1, 1961, β-estradiol-17-monopalmitate | None | 10 | 20 | 30 |
| Number of animals | 6 |  | 5 | 5 |
| Results 10/13/61 to 2/20/62: |  |  |  |  |
|    Average gain/animal (lbs.) | 218 |  | 277 | 280 |
|    Average lb./day gain | 1.68 |  | 2.13 | 2.13 |

The results of this example and of Examples 4 and 5 indicate that the optimum dosages for cattle range from 20 mg. for 500 lb. animals to 45 mg. for 1000 lb. animals.

EXAMPLE 7

This example used 19 cross-bred Southworth Oxford lambs, 10 ewes and 9 wethers born in the spring of 1961, which were being finished for market and during the test were progressively shifted from pasture to all grain feeding. The animals were ear-tagged for identification and were kept together in one flock and fed and watered alike throughout the test. Three randomly-selected groups of these lambs were given single subcutaneous injections of three different dosages of β-estradiol-17-monopalmitate in a composition prepared as in Example 1 and containing 15 mg. of the palmitate per shot, and a fourth group was used as a negative control. The dosages used and the results obtained are shown in the following table.

*Table VII*

|  | Controls | Treated | | |
| --- | --- | --- | --- | --- |
|  |  | Group A | Group B | Group C |
| Treatment August 23, 1961, β-estradiol-17-monopalmitate, mg | None | 15 | 30 | 45 |
| Number of lambs | 5 | 3 | 7 | 4 |
| Average weight when treated (lbs.) | 63 | 59 | 64.8 | 61.6 |
| Average lbs./lamb gain in first 11 days | −0.2 | 4.75 | 1.78 | 2.81 |
| From 11th to 31st day | 5.15 | 6.41 | 8.14 | 4.44 |
| From 31st to 45th day | 8.15 | 12.16 | 10.50 | 12.00 |
| From 45th to 59th day | 3.55 | 7.66 | 7.42 | 3.12 |
| Total in 59 days | 16.65 | 31.0 | 27.71 | 22.37 |

The results of this test indicate that the desirable dosage for 60 lb. lambs is in the range of 5 to 30 mg. of β-estradiol-17-monopalmitate, and that the effects last for a period of from 6 to 8 weeks.

EXAMPLE 8

Preliminary tests were made with turkeys, using compositions prepared as in Example 1 and administering shots subcutaneously in the neck adjacent the base of the skull, with dosages of from 10 mg. to 30 mg. of β-estradiol-17-monopalmitate. The results observed were similar to those obtained with chickens, in that the β-estradiol-17-monopalmitate produced improved finish and fattening in turkeys; and the best results seemed to be obtained with 20 mg. to 30 mg. dosages. Obviously, the dosage used should be the smallest which produces desired results. In addition, the turkeys were observed to be markedly quieter than turkeys treated with diethylstilbestrol, and to be substantially free of the treading tendencies experienced with diethylstilbestrol-treated turkeys.

We claim as our invention:

1. An anabolic composition for deposition through the skin of meat producing animals to promote fattening and finish therein, comprising β-estradiol-17-monopalmitate uniformly distributed in a non-toxic water-soluble injectable carrier comprising normally-solid polyethylene glycols having an average molecular weight of at least about 4,000 and a polyhydric alcohol plasticizer.

2. An anabolic composition for administration through the skin of meat-producing animals to promote fattening and finish therein, comprising a relatively water-insoluble anabolic agent consisting of a long-chain hydrocarbon aliphatic carboxylic acid ester of 17 β-estradiol in which the long-chain hydrocarbon aliphatic acid radical contains from 11 to 18 carbon atoms and not more than two double bonds, uniformly distributed in a non-toxic water-soluble injectable carrier comprising normally-solid polyethylene glycols having an average molecular weight of at least about 4,000 and a polyhydric alcohol plasticizer.

3. The process of treating meat-producing animals to promote fattening and finish thereof, which comprises depositing through the skin of the animal a long-chain hydrocarbon aliphatic carboxylic acid ester of 17 β-estradiol in which the long-chain hydrocarbon aliphatic acid radical contains from 11 to 18 carbon atoms and not more than two double bonds.

4. The process of treating meat-producing animals to promote fattening and finish thereof, which comprises depositing through the skin of the animal β-estradiol-17-monopalmitate.

5. The process according to claim 4 in which the β-estradiol-17-monopalmitate is injected in an injectable composition composed of said β-estradiol-17-monopalmitate and a carrier essentially composed of polyethylene glycol.

6. The process of treating meat-producing animals to promote fattening and finish thereof, which comprises injecting through the skin of the animal a plastic semi-solid composition of a relatively water-insoluble anabolic agent consisting of a long-chain hydrocarbon aliphatic carboxylic acid ester of 17 β-estradiol in which the long-chain hydrocarbon aliphatic acid radical contains from 11 to 18 carbon atoms and not more than two double bonds, uniformly distributed in a non-toxic water-soluble carrier comprising normally-solid polyethylene glycols having an average molecular weight of at least about 4,000 and a polyhydric alcohol plasticizer.

7. The process defined in claim 6, in which the anabolic agent is β-estradiol-17-monopalmitate.

8. The process defined in claim 7 in which the animals are chickens and the composition injected contains from 1 to 15 mg. of β-estradiol-17-monopalmitate.

9. The process defined in claim 7 in which the animals are beef cattle and the composition injected contains from 10 to 60 mg. of β-estradiol-17-monopalmitate.

10. The process defined in claim 7 in which the animals are sheep and the composition injected contains from 10 to 30 mg. of β-estradiol-17-monopalmitate.

11. The process of producing finished chickens which comprises depositing beneath the skin of chickens approximately 6 weeks prior to slaughter a quantity of the order of 5 to 10 mg. of β-estradiol-17-monopalmitate.

References Cited by the Examiner

UNITED STATES PATENTS 2,253,669   8/1941   Weisz _____ 260—397.5

OTHER REFERENCES

Engel: Vitamins and Hormones, vol. 17, 1959, Academic Press, New York, N.Y., pp. 206–210.

Gassner: Recent Progress in Hormone Research, vol. 14, 1958, Academic Press Inc., New York, N.Y., pp. 183–190 and 123.

JULIAN S. LEVITT, *Primary Examiner*.

MORRIS O. WOLK, FRANK CACCIAPAGLIA, JR., LEWIS GOTTS, *Examiners*.